US008968100B2

(12) United States Patent
Hohteri

(10) Patent No.: US 8,968,100 B2
(45) Date of Patent: Mar. 3, 2015

(54) SPORTS TRAINING APPARATUS AND METHOD

(71) Applicant: Sstatzz Oy, Helsinki (FI)

(72) Inventor: Harri Hohteri, Helsinki (FI)

(73) Assignee: Sstatzz Oy, Helsinki (FI)

( * ) Notice: Subject to any disclaimer, the term of this patent is extended or adjusted under 35 U.S.C. 154(b) by 0 days.

(21) Appl. No.: 13/767,756

(22) Filed: Feb. 14, 2013

(65) Prior Publication Data
US 2014/0228155 A1    Aug. 14, 2014

(51) Int. Cl.
*A63F 9/24*    (2006.01)
(52) U.S. Cl.
USPC .............................. 463/42; 342/42
(58) Field of Classification Search
USPC .................... 463/42; 348/157, 169
See application file for complete search history.

(56) References Cited

U.S. PATENT DOCUMENTS

| | | | |
|---|---|---|---|
| 6,380,933 B1 | 4/2002 | Sharir | |
| 6,710,713 B1 | 3/2004 | Russo | |
| 6,950,123 B2 | 9/2005 | Martins | |
| 7,499,077 B2 | 3/2009 | Li | |
| 7,620,466 B2 | 11/2009 | Neale | |
| 8,279,051 B2 | 10/2012 | Khan | |
| 8,289,185 B2 * | 10/2012 | Alonso | 340/870.11 |
| 8,506,370 B2 * | 8/2013 | Homsi | 463/2 |
| 2007/0135243 A1 * | 6/2007 | LaRue et al. | 473/467 |
| 2008/0089666 A1 | 4/2008 | Aman | |
| 2008/0129825 A1 * | 6/2008 | DeAngelis et al. | 348/169 |
| 2008/0140233 A1 | 6/2008 | Seacat | |
| 2008/0192116 A1 * | 8/2008 | Tamir et al. | 348/157 |
| 2009/0029754 A1 | 1/2009 | Slocum et al. | |
| 2009/0111582 A1 * | 4/2009 | Schuler et al. | 463/42 |
| 2009/0210078 A1 | 8/2009 | Crowley | |
| 2009/0262137 A1 | 10/2009 | Walker | |
| 2010/0030350 A1 | 2/2010 | House | |
| 2010/0134614 A1 | 6/2010 | Aman | |
| 2010/0201500 A1 * | 8/2010 | Stirling et al. | 340/407.1 |
| 2011/0071792 A1 | 3/2011 | Miner | |
| 2011/0194730 A1 | 8/2011 | Rhoads | |

(Continued)

FOREIGN PATENT DOCUMENTS

| | | |
|---|---|---|
| EP | 2025372 A2 | 2/2009 |
| EP | 2150057 A2 | 2/2010 |
| EP | 2515548 A1 | 10/2012 |
| WO | 95/08816 A1 | 3/1995 |

OTHER PUBLICATIONS

European Search Report, dated Jun. 2, 2014, re Application No. EP 14 15 3151, 1 page.

(Continued)

*Primary Examiner* — Masud Ahmed
(74) *Attorney, Agent, or Firm* — Ziegler IP Law Group, LLC.

(57) ABSTRACT

A system (234, 220, 200) for monitoring movements of one or more users and/or one or more projectiles during sports activities performed by the one or more users is provided. The one or more projectiles (200) incorporate sensors (202, 204) for sensing movements of the one or more projectiles (200) during the sports activities. A user interface (220) is used for presenting automated sports training services. A data processing arrangement (234, 232, 220) is used for analysing one or more records of the movements of the one or more projectiles (200) against reference data, for providing the automated sports training services to the one or more users via the user interface (220).

22 Claims, 2 Drawing Sheets

(56) References Cited

U.S. PATENT DOCUMENTS

Figure 1:
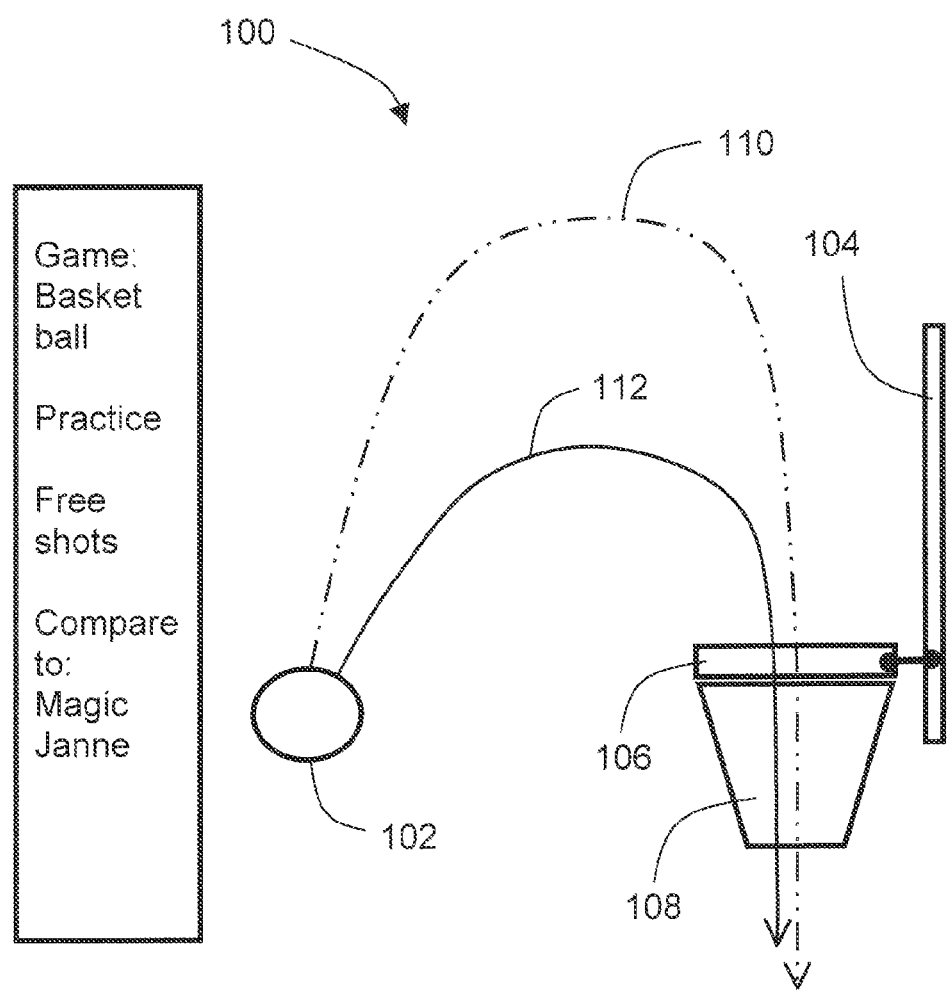

| | | |
|---|---|---|
| 2011/0304497 A1 | 12/2011 | Molyneux et al. |
| 2012/0057852 A1 | 3/2012 | Devleeschouwer |
| 2012/0058845 A1 | 3/2012 | Crowley |
| 2012/0143093 A1* | 6/2012 | Stirling et al. ............... 600/592 |
| 2012/0262329 A1* | 10/2012 | Molyneux et al. ............ 342/42 |
| 2012/0271440 A1 | 10/2012 | Lunner |
| 2013/0018493 A1* | 1/2013 | Amini ............................ 700/91 |
| 2013/0041590 A1* | 2/2013 | Burich et al. .................. 702/19 |

OTHER PUBLICATIONS

Anonymous: "GPS tracking Unit—Wikipedia, the free encyclopedia", Apr. 5, 2013, XP055140038, retrieved from the internet: URL:http://en.wikipedia.org/w/index.php?title=GPS_tracking_unit&oldid=54887452 [retrieved on Sep. 15, 2014], 6 pages.

Extended European Search Report; EP App. No. 14162990.7; dated Oct. 9, 2014, 9 pages.

* cited by examiner

SPORTS TRAINING APPARATUS AND METHOD

FIELD

The present disclosure relates to sports training apparatus, for example to sports training apparatus which is operable to compare sports playing performance of a given user with a reference sports player. Moreover, the present disclosure relates to methods of providing sports training using sports training apparatus, for example to methods of providing sports training using sports training apparatus, wherein the method includes comparing sports playing performance of a given user with a reference sports player. Furthermore, the disclosure relates to software products recorded on machine-readable data storage media, wherein the software products are executable on computing hardware for implementing aforesaid methods; the software products, for example, include software applications which are downloadable to wireless communication devices, for example smart phones, for implementing aforesaid methods.

BACKGROUND

Sports training equipment, for example as found in gymnasia and fitness centres, are well known for improving performances of sports people, especially when guidance from a personal coaching person is provided. However, personal coaches are expensive to hire and are not always familiar with playing styles and nuances of famous sports people whom a given sports person may desire to emulate. For example, when playing a game such as basketball, it is desirable to receive reliable advice on which parts of the given sports person's performance should be improved, or which parts of performance should be changed.

A person practicing a sport, whether as a hobby or as a sports professional, often desires to emulate famous professional sports players. The person practicing the sport, for example, desires to improve performance for their professional work or simply for receiving more enjoyment from playing a given sport. Such enjoyment, for example, pertains to playing like a famous professional player or making sports moves akin to those exhibited by the famous professional player.

A problem encountered with contemporary known sports is that there is a lack of automated systems and associated apparatus for providing feedback to sports persons regarding how to improve their sports-playing performance. Presently, as aforementioned, advice is provided to sports persons by coaches or personal trainers. For example, a given coach analyses a basketball shot and thereafter gives advice regarding a manner in which the basketball shot can be improved. Similarly, for games such as tennis, a personal trainers or coach provides advice, namely "tips", regarding how to improve shots.

It is well known to track movement of one or more projectiles, for example one or more balls, utilized when playing a sports game, for example football or basket ball, to determine statistical information relating to the sports game. Such statistical information can include a number of goals or points scored, and performance of one or more players of the sports game. Such tracking has often been implemented using cameras, personnel collating statistics manually as well as using sensors included in the one or more projectiles. However, known approaches for analysing movement of the one or more projectiles are not well developed such that insufficient analysis, such that inadequate analysis of sports games utilizing the one or more projectiles is not presently achievable.

In a US patent application no. US2012/058845A1, there is described a basket ball which incorporates motion sensors. The motion sensors include, for example, one or more accelerometers, one or more angular rate gyroscopic sensors and one or more magnetometers. In the application, it is elucidated that sensor signals from the motion sensors can be analyzed to generate statistical results, but is devoid of detail of how the statistical analysis can be performed in practice.

There arises therefore a problem that known apparatus for providing analysis of trajectories of one or more projectiles associated with sports projectiles are not sufficiently evolved and do not provided statistical analysis to a fullest extent which is potentially feasible to achieve, for example for providing automated personal trainer-type services to sports persons.

SUMMARY OF THE DISCLOSURE

The present disclosure seeks to provide an improved sports training apparatus, wherein automated sports training advice is provided.

The present disclosure also seeks to provide an improved method of using sports apparatus, wherein the method is capable of providing automated sports training advice.

According to a first aspect of the present disclosure, there is provided a system as claimed in appended claim 1: there is provided a system for monitoring movements of one or more users and/or one or more projectiles during sports activities performed by the one or more users, wherein the one or more projectiles incorporating sensors for sensing movements of the one or more projectiles during the sports activities, a user interface for presenting automated sports training services, and a data processing arrangement for analysing one or more records of the movements of the one or more projectiles against reference data, for providing the automated sports training services to the one or more users via the user interface.

The disclosure is of advantage in that that automated collection of movements and automated comparison with the reference data enables automated sports training services to be provided.

Optionally, in the system, the reference data pertains to one or more professional sports personalities, wherein the one or more users are able to select amongst the one or more professional sports personalities for purpose of analysis via the users interface. More optionally, in the system, the automated sports training service is operable to provide the one or more users with automated advice regarding how to modify their sports-playing activities to emulate those of the one or more selected professional sports personalities.

Optionally, the system is operable to enable sharing of analysis results within a peer group of the one or more users.

Optionally, the system is operable to generate automated messages when the one or more users score during the sports training activities.

Optionally, in the system, the service is provided in return for payment based upon at least one of:
 (a) per analysis performed by the system;
 (b) per download of a software application to a mobile wireless communication device operable to assist to implement the system;
 (c) on a periodic subscription basis; and
 (d) per advertisement present to the one or more user via the user interface.

According to a second aspect of the disclosure, there is provided a method of using a system for monitoring movements of one or more users and/or one or more projectiles during sports activities performed by the one or more users, wherein the method includes:

using one or more projectiles incorporating sensors for sensing movements of the one or more projectiles during the sports activities;

(ii) using a user interface for presenting automated sports training services to the one or more users; and (iii) using a data processing arrangement for analysing one or more records of the movements of the one or more projectiles against reference data, for providing the automated sports training services to the one or more users via the user interface.

Optionally, in the method, the reference data pertains to one or more professional sports personalities, wherein the one or more users are able to select amongst the one or more professional sports personalities for purpose of analysis via the users interface. More optionally, in the method, the automated sports training service is operable to provide the one or more users with automated advice regarding how to modify their sports-playing activities to emulate those of the one or more selected professional sports personalities.

Optionally, the method includes operating the system to enable sharing of analysis results within a peer group of the one or more users.

Optionally, the method includes using the system to generate automated messages when the one or more users score during the sports training activities.

Optionally, in the method, the service is provided in return for payment based upon at least one of:
(a) per analysis performed by the system;
(b) per download of a software application to a mobile wireless communication device operable to assist to implement the system;
(c) on a periodic subscription basis; and
(d) per advertisement present to the one or more user via the user interface.

According to a third aspect of the disclosure, there is provided a software product recorded on machine-readable data media, wherein the software application is executable upon computing hardware for implementing a method pursuant to the second aspect of the disclosure.

Optionally, the software product is downloadable as a software application to a mobile wireless communication device for implementing a user interface for providing automated sports training services.

It will be appreciated that features of the disclosure are susceptible to being combined in various combinations without departing from the scope of the disclosure as defined by the appended claims.

DESCRIPTION OF THE DIAGRAMS

Figure 2:
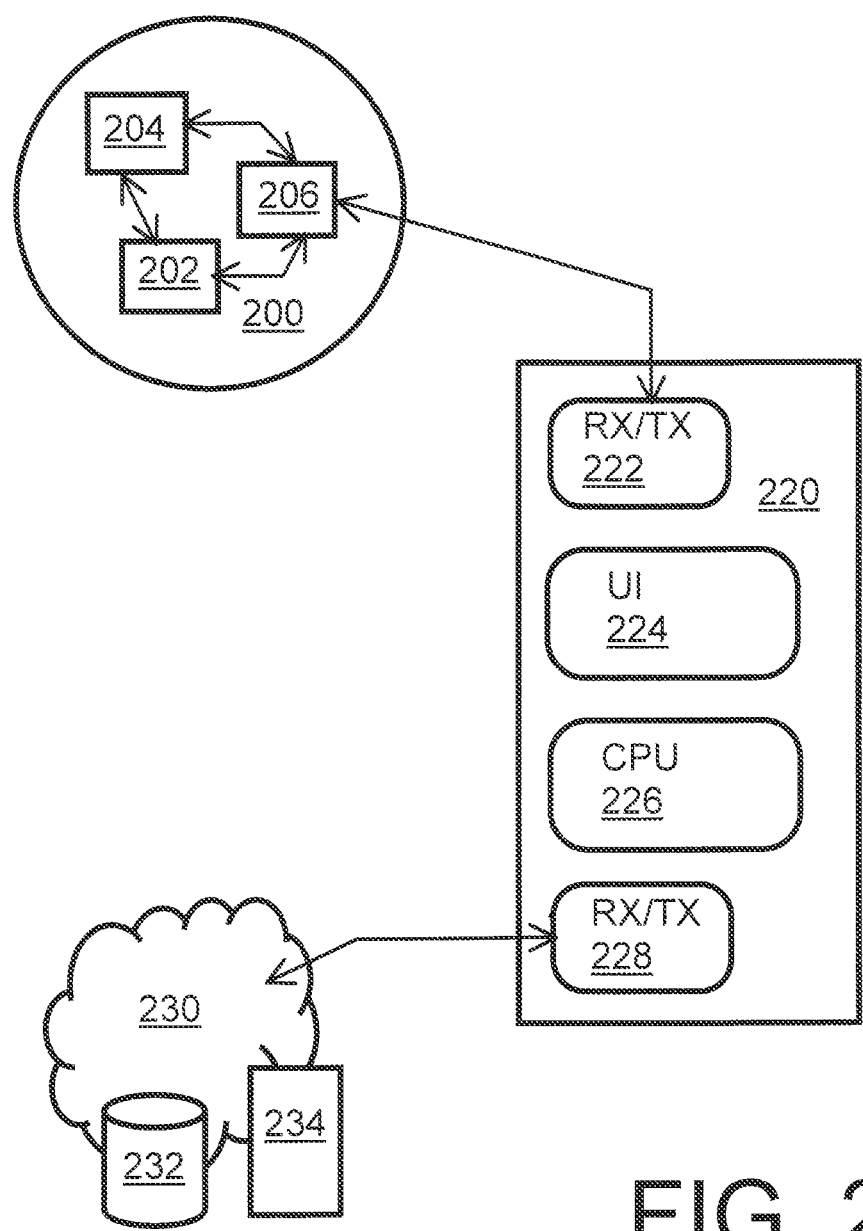

Embodiments of the present disclosure will now be described, by way of example only, with reference to the following diagrams wherein:

FIG. 1 is a schematic illustration of a game-playing scenario in which gaming playing performance is improved using a sports training apparatus pursuant to the present disclosure; and FIG. 2 is a schematic illustration of an embodiment of a sports training apparatus pursuant to the present disclosure.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE DISCLOSURE

In overview, the present disclosure is concerned with a sports training apparatus which is operable to record one or more signals from one or more sensors generated during sports training, and thereafter to analyse the one or more signals by comparing against one or more performance templates, for example generated by monitoring sports playing activities of famous sports persons, and therefrom determining how player performance can be improved during the sports training. Beneficially, one or more wireless devices, for example one or more smart phones, are employed for receiving and communicating the one or more signals to a remote data analysis system which can automatically provide sports coaching and advice. The sports training apparatus is thereby capable of providing sports training in an automated manner, which is less expensive in comparison to employing an actual coach or personal trainer.

In various embodiments of the present disclosure, there are beneficially employed software products implemented by way of downloadable software applications onto wireless communication devices, for example iPad, iPhone, and similar. "iPad" and "iPhone" are registered trademarks. When executed upon computing hardware of wireless communication devices, the software applications provide a user interface (UI), for example a graphical user interface (GUI), via which a given user is able to select a sport of interest for training purposes, for example Embodiments of the present disclosure are suitable for sports such as football, soccer, basketball, baseball, hockey, tennis, skiing, but not limited thereto. The aforesaid software products, when executed upon computing hardware, allows a given user to select which professional sports player that the given user is desirous to emulate, for example the given user is a fan of a selected professional sports player. When the given user selects a profile of a desired professional sports player on his/her wireless-enabled device, for example smart phone, data describing sports characteristics of the desired professional sports player is fetched via a wireless communication network from one or more servers supporting an automated personal sports trainer service; for example, the software application executing upon the wireless-enabled device downloads data including parameters pertaining to free throws made by a specific famous basketball player. Optionally, the data is downloaded without cost to the given user, alternatively at cost, for example by way of payment per download or by way of periodic subscription to the aforesaid service.

The wireless-enabled device of the given user is also operable, when executing the software application, to receive, either directly via near-field wireless communication, or via a wireless communication network, sensed trajectory data of a sports projectile, for example a basket ball, used for training the given user. The basket ball has embedded therein one or more sensors, for example Silicon micromachined pressure sensors, accelerometers and gyroscopes (i.e. angular sensors) providing the basket ball with a form of inertial navigation unit (INU), a data processing arrangement for processing signals generated by the one or more sensors, and a wireless interface for enabling the basket ball to communicate information describing its trajectory in space.

An example embodiment of the disclosure will now be described with reference to FIG. 1. A given user (not shown) is practicing free throws in a game of basketball. Using a software application downloaded to his/her smart phone and executing on computing hardware thereof, the given user selects his/her as an option on a graphical user interface (UI) 100 presented on a screen of the smart phone. The graphical user interface 100 provides an information field 120 for displaying selection made by the given user, for example selected game, selected type of practice, and selected sports professional who the given user is desirous to emulate or be compared against. In FIG. 1, the given user is practicing free throws in a game of basketball, and is desirous to compare his/her throws with those of "Magic Janne". The given user throws a basketball 102 and trajectory data is collected by in real-time from the basketball 102 and communicated to the software application executing upon the smart phone; thereafter, a sensed trajectory 112 of the basketball 102 is presented to the given user via the graphical user interface 100, for example by way of one or more animations showing the sensed trajectory 112 together with a corresponding trajectory 110 achieved by the famous sports professional "Magic Janne". In FIG. 1, the basketball 102 has two trajectories 110, 112, wherein both shots of the basketball 102 have gone through a rim 106 and a net 108 mounted to a backboard 104.

The given user is then able to employ his/her smart phone to analyse his/her shots of the basketball 102 against those of the professional "Magic Janne". Based on such analysis, the software application executing upon the smart phone to give recommendations to the given user, for example "Next time, aim a bit higher and shoot with less force" or "Next time, aim slightly to the left and shoot with more force". Optionally, such analysis is executed spatially locally at the smart phone, alternatively the analysis is performed remotely from the smart phone, for example at an external data server operating in conjunction with the smart phone and in mutually wireless communication therewith. The external data server hosts, for example, performance data pertaining to one or more professional sports persons, for example aforesaid "Magic Janne" or "Hercules Moosedog".

In respect of the providing the one or more sensors for the basketball 102, technical implementations as described in a U.S. patent application Ser. No. 13/660,385 are hereby incorporated by reference for purposes of implementing embodiments of the disclosure. Beneficially, the one or more sensors are operable to generate signals indicative of acceleration, rotation, spin of the basketball 102. Optionally, the one or more sensors are employed in other sports equipment, for example tennis rackets, baseball bats, skis, football boots, cricket bats, cricket balls, diving boards and so forth.

Referring next to FIG. 2, there is shown a schematic architecture of a system or apparatus required for supporting training to the given user, for example as illustrated in FIG. 1. A basketball 200, or other sports-related equipment, includes one or more sensors 204, for example accelerometers, gyroscopic angular sensors, magnetometers, to record dynamic motion of the basketball 200 when in flight. The basketball 200 also optionally includes location sensors 202 such as a wireless beacon to send information to a base station for Cartesian (x, y, z) spatial position measurement purposes, enabling an exact position of the basketball 200 as a function of time to be sensed and determined. Optionally, the basketball 200 includes a GPS sensor, for example relevant when the ball 200 is implemented as a golf ball used on a golf range of considerable spatial extent.

The basketball 200 includes an input/output interface 206 for sending recorded sensor information, namely one or more digitized sensor signals describing movement and/or spatial location of the basketball 200. Optionally, the input/output interface 206 is implemented via a Wireless Local Area Network (WLAN), for example the input/output interface 206 is beneficially implemented via a small web server, thereby allowing access to data describing trajectories of the basketball 200 via HTTP protocol from the web server (not shown).

Sensor information transmitted from the basketball 200 is received by the smart phone of the given user, wherein the smart phone is denoted by 220 in FIG. 2. The smart phone 200 is beneficially provided with sufficient computational power to perform one or more analyses of movements of the basketball 200, for providing automated person training for the given user. The smart phone 220 includes an interface 224 for presenting statistical results and other related information for the given user, for example an analysis of where the given user's sports performance is lacking in comparison to the substantially perfect sports performance of "Magic Janne".

The graphical user interface (UI) 224 is beneficially used to control both smart phone software as well as software products, namely downloaded software applications, required for implementing the present disclosure. The software products for performing the aforementioned analysis is executed by a central processing unit (CPU) 226 of the smart phone, for example implemented as a reduced instruction set computer (RISC) architecture. Moreover, the smart phone 220 includes a wireless interface 228 to communicate via a communication network, for example via the Internet or similar, to a server system 234. Optionally, the server system 234 is coupled in communication with a database 232, for example whereat examples of sports performance are recorded against names of famous sport personalities.

In another embodiment of the disclosure, the smart phone 220 sends information after each practice session undertaken by the given user has been completed, for example to a social media web-site, for example contemporary Facebook or similar; "Facebook" is a registered trademark. Optionally, the smart phone 220 is configured to send a tweet via contemporary Twitter or similar, each time the given user achieved a successful shot; "Twitter" is also a registered trademark. Optionally, the smart phone 220 is operable to send a status update to an aforementioned social network each time the given user is able to achieve a three-point score in aforesaid automated basketball sports training. Optionally, recipients within a social network which receive information from the smart phone 220 are definable by the given user, for example for privacy purposes.

In an example embodiment of the disclosure, a sports projectile, for example the basketball 200 or similar, is given to one or more professional sports players. The professional sports players then proceed to record their practices and/or games to generate reference data for the system; associated moves, shots and similar are stored in the database 232. This information, when stored in the database 232, is beneficially used as reference information, namely "base information", for the automated sports training server provided from the system 234. Moreover, the system 234 is optionally configurable to in-app purchase items for the given user for training purposes. Namely items definable and purchasable via a software application already executing upon the smart phone 220; such in-app purchase items include, for example, statistical information pertaining to professional sports users of the system 234.

In addition to recording movements of the given user and shots of projectiles, for example the basketball 200 and similar, the system 234 is capable of working with other sports-enhancement systems, for example a system as described in a patent application no. U.S. Ser. No. 13/550,247 which is hereby incorporated by reference. Optionally, there system 234 is configurable to record statistics and moves pertaining to a plurality of players involved in playing a game such as basketball and similar.

Optionally, the system 234 is operable to show one or more users whether or not their moves or related movements are similar to those of their favourite peer professional sports teams. Additionally, the given user is able to configure the system 234 to download typical movement of a professional sports player within a sports field for enabling the given user to imitate the professional sports player as aforementioned. Optionally, the system 234 is employed to collect data pertaining to special sports events based upon rules from a selected set of games, for example for certain National Basketball Association (NBA) games whereat teams are playing in a mutually competitive manner.

Services provided by the system 234 are beneficially paid for in one or more of following ways:

by advertisements presented concurrently whilst the automated sports training service is being provided;

(ii) by subscription, for example daily, weekly, monthly or annual subscription;

(iii) by per-download of application software, for example to the smart phone 220; and (iv) per analysis performed by the system 234 or in the smart phone 220.

Although the user using his/her smart phone 220 for implementing the present disclosure is described in the foregoing, it will be appreciated that alternative types of computing devices are alternatively employed, for example tablet computers, lap-top computers, personal computers (PC), personal digital assistants (PDA), and similar.

Optionally, not only the basketball 200 or similar, but also the given user are provided with one or more sensors for detecting their movements and relative spatial positions when undertaking sports activities; for example, one or more limbs of the given user can be provided with one or more sensors for sensing their movement during sports activities.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

I claim:

1. A method of monitoring and analyzing data indicative of a location of a user on a playing area and/or a movement of a basketball during a basketball activity, wherein the method comprises:

detecting, in a wireless communication device, a data signal indicative of a movement of the one or more basketball corresponding to a shot by a user, the basketball incorporating sensors for sensing movements of the basketball during the basketball activity and transmitting the data signal to the wireless communication device, the wireless communication device including a processing unit, which is configured to;

analyze the data signal and generate shot movement data from the movements of the basketball corresponding to the shot by the user;

compare the shot movement data against reference shot data;

determining a deviation between the shot movement data and the reference shot data;

presenting an indication of the deviation on a user interface of the wireless communication device; and based on the deviation between the shot movement data and the reference shot data, presenting automated advice on how to modify the shot by the user to emulate the reference shot data for providing the automated sports training services to the user.

2. A method as claimed in claim 1, wherein the reference shot data pertains to one or more professional sports personalities, wherein the method comprises enabling the processing unit to allow the user to select amongst the one or more professional sports personalities for purpose of analysis via the users interface.

3. A method as claimed in claim 2, wherein the method comprises providing the user with automated advice via the user interface on how to modify the shot by the user to emulate the reference shot data pertaining to the one or more professional sports personalities.

4. A method as claimed in claim 1, wherein the method includes enabling the processing unit to share results of the shot movement data over an electronic communication network to a peer group of the one or more users.

5. A method as claimed in claim 1, wherein the method comprises enabling the processor to generate automated messages via the user interface when the shot movement data indicates a score by the user during the sports training activities.

6. A method as claimed in claim 1, wherein the automated sports training services are provided in return for payment based upon at least one of:

per analysis performed by the system;

per download of a software application to a mobile wireless communication device operable to assist to implement the system;

on a periodic subscription basis; and per advertisement presented to the one or more user via the user interface.

7. A software product recorded on non-transitory machine-readable data media, wherein the software product is executable upon computing hardware for implementing a method as claimed in claim 1.

8. A software product as claimed in claim 7, wherein the software product is downloadable as a software application to a mobile wireless communication device for implementing a user interface for providing the automated sports training services.

9. The method of claim 1, wherein the processor is configured to:

determine a trajectory of the basketball during a shot relative to a playing area from the movement data;

compare the trajectory of the basketball during the shot to a trajectory corresponding to the reference data;

determine a deviation between the trajectory of the basketball during the shot and the trajectory of the reference data; and provide instructions via the user interface of the wireless device to correct the deviation between the trajectory of the basketball during the shot and the trajectory of the reference data.

10. The method of claim 1, wherein the reference shot data is based on a previous shot by the user, and the shot movement data is compared to reference shot data corresponding to the previous shot to identify similarities between a current shot and the previous shot.

11. A system for providing automated sports training services to a user, comprising:
- a basketball having a sensor disposed therein, the sensor configured to detect a movement of the basketball relative to a playing area;
- a wireless communication device configured to receive a movement signal from the sensor, the movement signal corresponding to a shot made by a user with the basketball; and
- a processor unit configured to:
  - determine a shot movement data of the basketball from the movement signal corresponding shot made by the user;
  - compare the shot movement data of the basketball to a reference basketball shot movement data;
  - present an indication of a deviation between the shot movement data of the basketball during the shot and the reference basketball shot movement data; and
  - based on the deviation between the shot movement data of the basketball during the shot and the reference basketball shot data, present an instruction to the user for achieving the reference basketball shot data.

12. A system as claimed in claim 11, comprising a user interface on a display of the device, wherein the reference basketball shot movement data pertains to one or more professional sports personalities, and the processor unit is configured to enable user selection from amongst the one or more professional sports personalities for purpose of analysis via the user interface.

13. A system as claimed in claim 12, wherein the processor is configured to provide the user with automated advice regarding how to modify the movement of the basketball to emulate the reference basketball shot movement data of the selected professional sports personality.

14. A system as claimed in claim 11, wherein the system is configured to enable sharing of analysis results within a peer group of the user.

15. A system as claimed in claim 11, wherein the system is configured to generate automated messages when the detected movement of the basketball is indicative of a score during a sports activity.

16. A system as claimed in claim 11, wherein the sports training service is provided in return for payment based upon at least one of:
- per analysis performed by the system;
- per download of a software application to a mobile wireless communication device operable to assist to implement the system;
- on a periodic subscription basis; and
- per advertisement presented to the user via a user interface.

17. The system of claim 11, wherein the processor unit is configured to determine a trajectory of the basketball from the shot movement data and compare the trajectory of the basketball to a trajectory of reference basketball shot movement data.

18. The system of claim 17, wherein the processor unit is configured to provide an instruction to the user to alter the trajectory of the basketball during the shot to correspond to the trajectory of the reference basketball shot movement data.

19. The system of claim 18, wherein the instruction is in a form of a visual cue presented on a display of the wireless communication device illustrating a deviation between the trajectory of the basketball during the shot and the trajectory of the reference basketball shot movement data.

20. The system of claim 17, wherein the reference basketball shot movement data is a pre-recorded movement and trajectory of a basketball during a shot.

21. The system of claim 11, wherein the processor is configured to provide an instruction to the user to alter the user's movement of the basketball to correspond with the trajectory of the reference basketball shot movement data.

22. A system for providing automated sports training services to a user, comprising:
- a basketball having a sensor disposed therein, the sensor configured to detect a movement of the basketball relative to a playing area;
- a wireless communication device configured to receive a movement signal from the sensor, the movement signal corresponding to a shot made by a user with the basketball; and
- a processor unit configured to:
  - determine shot movement data of the basketball from the movement signal corresponding to the shot made by the user;
  - determine a trajectory of the basketball from the shot movement data;
  - compare the trajectory of the basketball to a trajectory of reference basketball shot movement data;
  - present an indication of a deviation between the trajectory of the basketball during the shot and the trajectory of the reference basketball shot movement data; and
  - based on the deviation between the trajectory of the basketball during the shot and the trajectory of the reference basketball shot data, present an instruction to the user for achieving the trajectory of the reference basketball shot data.

* * * * *